3,160,627
11,12-EPITHIOSTEROID OF PREGNANE SERIES
Taichiro Komeno, Osaka-shi, and Junichi Kawanami, Toyonaka-shi, Japan, assignors to Shionogi & Co., Ltd., Osaka, Japan
No Drawing. Filed May 13, 1963, Ser. No. 280,097
Claims priority, application Japan May 18, 1962
13 Claims. (Cl. 260—239.5)

The present invention relates to 11,12-epithiosteroids of the pregnane series and production thereof.

It is an object of the present invention to embody 11,12-epithiopregnanes. Another object of the invention is to embody 11,12-epithiopregnanes having physiological activities. A further object of the invention is to embody a process for converting 11,12-epoxypregnanes into 11,12-epithiopregnanes. These and other objects will be apparent to those conversant with the art to which the present invention pertains from the following description of the general class of compounds and certain specific examples of particular members as well as general and specific methods for their production.

The starting materials of the present invention are 11,12-epoxypregnanes, i.e. 11α,12α-epoxypregnanes and 11β,12β-epoxypregnanes, having the following partial formula:

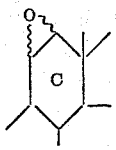

wherein the ripple mark (⸮) represents α- or β-configuration. The 11,12-epoxypregnanes include, for instance, the steroids having the following specific formula:

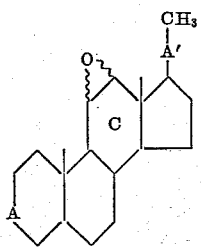

wherein A and A' each represents a methylene group, a carbonyl group, a ketalated carbonyl group such as lower alkylenedioxymethylene (e.g. ethylenedioxymethylene, propylenedioxymethylene), a hydroxymethylene group or an acylated hydroxymethylene group such as lower alkanoyloxymethylene (e.g. acetyloxymethylene, propionyloxymethylene, butyryloxymethylene), a double bond can exist between the 5-position and the adjacent position thereto and the ripple mark represents α- or β-configuration. More specifically, the 11,12-epoxypregnanes may be exemplified as follows:

11α,12α-epoxy-5α-pregnane,
3α-hydroxy-11α,12α-epoxy-5β-pregnane,
3β-hydroxy-11α,12α-epoxy-5α-pregnane,
3β,20β-dihydroxy-11α,12α-epoxy-5α-pregnane,
3β,20β-diacetyloxy-11α,12α-epoxy-5α-pregnane,
3β,20β-diacetyloxy-11α,12α-epoxy-5β-pregnane,
3,20-dioxo-11α,12α-epoxy-5α-pregnane,
3,20-dioxo-11α,12α-epoxy-5β-pregnane,
3,20-dioxo-11α,12α-epoxy-4-pregnene,
3,3-ethylenedioxy-11α,12α-epoxy-5-pregnene,
11β,12β-epoxy-5α-pregnane,
3α-hydroxy-11β,12β-epoxy-5β-pregnane,
3β-hydroxy-11β,12β-epoxy-5α-pregnane,
3β,20β-dihydroxy-11β,12β-epoxy-5α-pregnane,
3β,20β-diacetyloxy-11β,12β-epoxy-5α-pregnane,
3β,20β-diacetyloxy-11β,12β-epoxy-5β-pregnane,
3,20-dioxo-11β,12β-epoxy-5α-pregnane,
3,20-dioxo-11β,12β-epoxy-5β-pregnane,
3,20-dioxo-11β,12β-epoxy-4-pregnene,
3,3-ethylenedioxy-11β,12β-epoxy-5-pregnene, etc.

The conversion of 11,12-epoxypregnanes into 11,12-epithiopregnanes can be accomplished substantially by three steps represented by the following partial formulae:

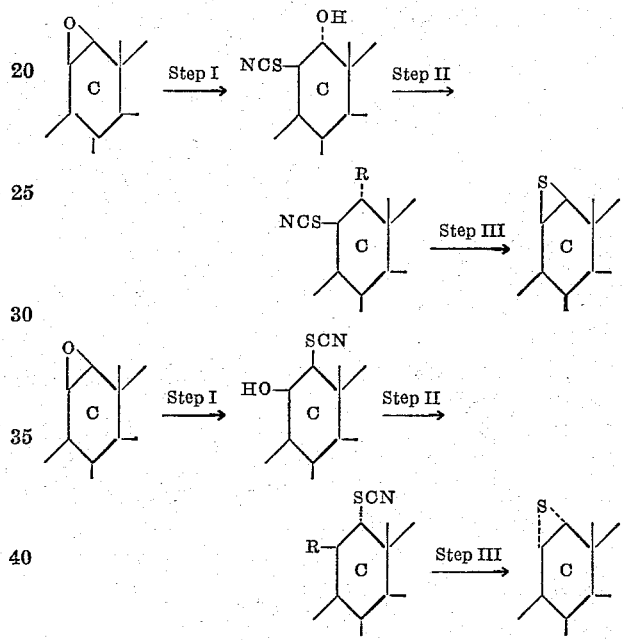

wherein R is an acid radical such as halogen (e.g. chlorine, bromine), lower alkanoyloxy (e.g. acetyloxy, propionyloxy, butyryloxy, pentanoyloxy), benzoyloxy, lower alkanesulfonyloxy (e.g. methanesulfonyloxy, ethanesulfonyloxy), benzenesulfonyloxy and lower alkylbenzenesulfonyloxy (e.g. toluenesulfonyloxy, xylenesulfonyloxy). Of these steps, the first step per se has been disclosed in U.S. patent application Ser. No. 37,050 of K. Takeda and T. Komeno, filed June 20, 1960 and now abandoned, and is not included in the present invention. However, the step will be hereinafter illustrated for convenience as well as the other two steps. When any radical of the starting 11,12-epoxypregnane is undesirably affected by the reagent employed in any step, such a radical is required to be protected in a conventional manner prior to the execution of the reaction in such step. However, whether the protection is needed may be obvious to those conversant with the art.

In the first step, the 11,12-epoxypregnanes are subjected to the fission of epoxy linkage with thiocyanic acid. The reaction may be carried out by introducing thiocyanic acid gas produced by a conventional method [H. Buck et al.: Z anorg. Chem., 77, 51 (1912)] into a solution of the 11,12-epoxypregnane in a suitable solvent (e.g. benzene, carbon disulfide, dichloromethane, chloroform, carbon tetrachloride, ether) or adding the 11,12-epoxypregnane to a solution of thiocyanic acid prepared in advance by shaking a salt of thiocyanic acid (e.g. sodium thiocyanate, potassium thiocyanate) with an acid (e.g. phosphoric acid) in a suitable solvent (e.g. benzene, carbon disulfide, dichloromethane, chloroform, carbon tetrachloride, ether, dioxane), followed by allowing the resultant mixture to stand at room temperature (10 to 30° C.) or heating the same on a water-bath. Generally speaking, it takes a relatively long time for completion of the reaction and, therefore, excess of thiocyanic acid may be preferably employed.

In the second step, the resulting thiocyanatohydrines are subjected to the acylation with an organic or inorganic acylating agent such as halogenating agent (e.g. thionyl chloride, thionyl bromide, phosphorus oxychloride, phosphorus trichloride, phosphorus tribromide, phosphorus pentachloride), lower alkanoylating agent (e.g. acetic anhydride, propionic anhydride, acetyl chloride, propionyl chloride), benzoylating agent (e.g. benzoyl chloride, benzoyl bromide), lower alkanesulfonylating agent (e.g. methanesulfonyl chloride, ethanesulfonyl chloride), benzenesulfonylating agent (e.g. benzenesulfonyl chloride, benzenesulfonyl bromide) or lower alkylbenzenesulfonylating agent (e.g. toluenesulfonyl chloride, xylenesulfonyl chloride). Although any said acylating agent can be equally employed, the use of lower alkanesulfonylating agent or lower alkylbenzenesulfonylating agent is the most preferred. When these preferred agents are employed, the reaction can be accomplished by treating the thiocyanatohydrine with the acylating agent in the presence of a condensing agent (e.g. pyridine, picoline, triethylamine) at room temperature (10 to 30° C.) or while ice-cooling.

In the third step, the resulting acylated thiocyanatohydrines are subjected to the formation of epithio linkage with a basic agent. As the basic agent, there may be employed alkali metal hydroxide (e.g. sodium hydroxide, potassium hydroxide), alkaline earth metal hydroxide (e.g. calcium hydroxide, barium hydroxide), alkali metal hydride (e.g. lithium aluminum hydride, lithiumborohydride, sodium borohydride) and the like. The reaction can be performed by heating the acylated thiocyanatohydrine with the said basic agent in a suitable solvent (e.g. methanol, ethanol, ether, tetrahydrofuran, dioxane), if necessary, while refluxing. Although the reaction can proceed at room temperature (10 to 30° C.), it takes usually a long time for completion of the reaction.

The final products are the 11,12-epithiopregnanes, i.e. 11α,12α-epithiopregnanes and 11β,12β-epithiopregnanes, having the following partial formula:

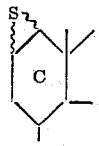

wherein the ripple mark represents α- or β-configuration. The 11,12-epithiopregnanes include, for instance, the steroids having the following specific formula:

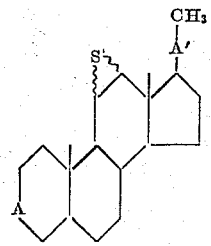

wherein A and A' each has the same significance as designated above, a double bond can exist between the 5-position and the adjacent position thereto and the ripple mark represents α- or β-configuration. More specifically, the 11,12-epithiopregnanes may be exemplified as follows:

11α,12α-epithio-5α-pregnane,
3α-hydroxy-11α,12α-epithio-5β-pregnane,
3β-hydroxy-11α,12α-epithio-5α-pregnane,
3β,20β-dihydroxy-11α,12α-epithio-5α-pregnane,
3β,20β-diacetyloxy-11α,12α-epithio-5α-pregnane,
3β,20β-diacetyloxy-11α,12α-epithio-5β-pregnane,
3,20-dioxo-11α,12α-epithio-5α-pregnane,
3,20-dioxo-11α,12α-epithio-5β-pregnane,
3,20-dioxo-11α,12α-epithio-4-pregnene,
3,3-ethylenedioxy-11α,12α-epithio-5-pregnene,
11β,12β-epithio-5α-pregnane,
3α-hydroxy-11β,12β-epithio-5β-pregnane,
3β-hydroxy-11β,12β-epithio-5α-pregnane,
3β,20β-dihydroxy-11β,12β-epithio-5α-pregnane,
3β,20β-diacetyloxy-11β,12β-epithio-5α-pregnane,
3β,20β-diacetyloxy-11β,12β-epithio-5β-pregnane,
3,20-dioxo-11β,12β-epithio-5α-pregnane,
3,20-dioxo-11β,12β-epithio-5β-pregnane,
3,20-dioxo-11β,12β-epithio-4-pregnene,
3,3-ethylenedioxy-11β,12β-epithio-5-pregnene, etc.

These 11,12-epithiopregnanes are characterized by showing anti-DOCA (desoxycorticosterone acetate) activity in general. For instance, 3β,20β-dihydroxy-11β,12β-epithio-5α-pregnane showed the inhibition of the response caused by 10 micrograms of DOCA, when administered subcutaneously at a dose of 5 milligrams per rat weighing from 140 to 160 grams. Other 11,12-epithiopregnanes also show the similar activity. Accordingly, they are useful as anti-DOCA agents.

The following examples set forth illustratively presently-preferred embodiments of the present invention. In the examples, abbreviations have conventional meanings, e.g. mg.=milligram(s), g.=gram(s), ml.=millilitre(s), ° C.=degrees centigrade.

*Example 1*

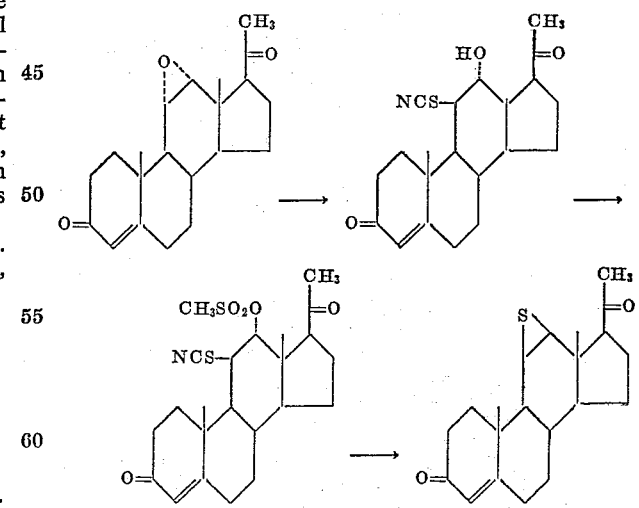

To a solution of 3,20-dioxo-11α,12α-epoxy-4-pregnene (324 mg.) in acetic acid (10 ml.), there is added a solution of thiocyanic acid (300 mg.) in chloroform (10 ml.), and the resultant mixture is allowed to stand for 65 hours at room temperature (10 to 30° C.). The reaction mixture is shaken with ether (40 ml.). The ether layer is washed with water, sodium carbonate solution and water in order and then dried. By removal of the solvent under reduced pressure, there is obtained a yellow oil (470 mg.). The oil is chromatographed on magnesium silicate and eluted with petroleum ether-benzene (1:1)~benzene to give 3,20-dioxo-11β-thiocyanato-12α-hydroxy-4-pregnene (280 mg.) as a yellow oil.

To a solution of 3,20-dioxo-11β-thiocyanato-12α-hydroxy-4-pregnene (1.1 g.) above prepared in pyridine (10 ml.), there is added methanesulfonyl chloride (1 ml.), and the resultant mixture is allowed to stand at room temperature (10 to 30° C.) overnight. The reaction mixture is poured onto ice-water and then shaken with ether. The water layer is shaken with chloroform. The chloroform layer is dried and evaporated to give a dark red oil (820 mg.). The oil is purified by chromatography and crystallized from a mixture of ether and chloroform to give 3,20-dioxo-11β-thiocyanato-12α-methanesulfonyloxy-4-pregnene as prisms melting at 158 to 160° C.

To a solution of potassium hydroxide (1.5 g.) in methanol (30 ml.), there is added 3,20-dioxo-11β-thiocyanato-12α-methanesulfonyloxy-4-pregnene (1.5 g.) above prepared, and the resultant mixture is allowed to stand at room temperature (10 to 30° C.) overnight. The reaction mixture is combined with water and shaken with a mixture of ether and chloroform (4:1). The organic solvent layer is washed with water and evaporated to give an oily substance (911 mg.). The oily substance is chromatographed on alumina (27 g.) and eluted with benzene-benzene-chloroform (9:1). The eluate is crystallized from acetone and recrystallized from methanol to give 3,20-dioxo-11β,12β-epithio-4-pregnene (362 mg.) as pillars melting at 170.5 to 172° C.

The starting material of this example, 3,20-dioxo-11α,12α-epoxy-4-pregnene, is prepared from 3,20-dioxo-4,11-pregnadiene [G. Just et al.: J. Org. Chem., 23, 12 (1958)] according to the following scheme:

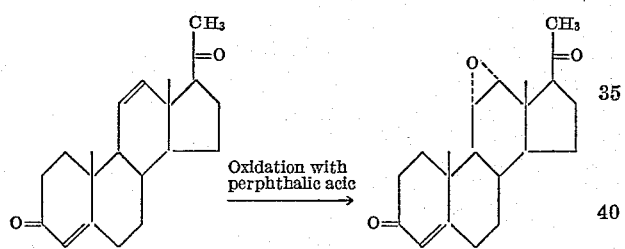

*Example 2*

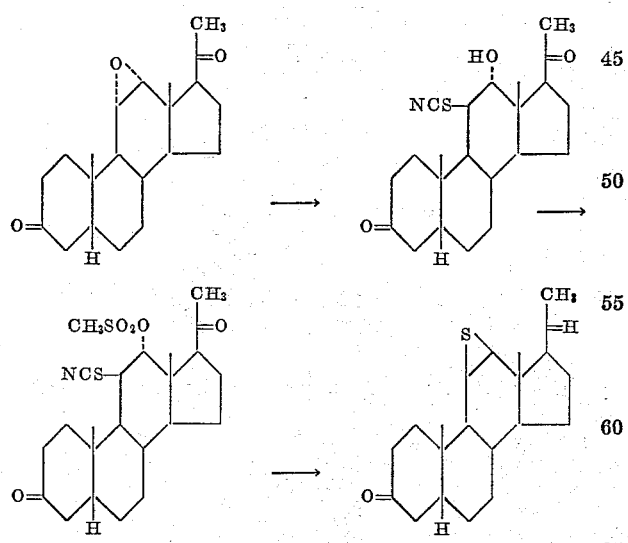

To an ethereal solution of acid prepared from potassium thiocyanate (3.8 g.) and 85% phosphoric acid (4.7 g.), there is added 3,20-dioxo-11α,12α-epoxy-5β-pregnane (435 mg.), and the resultant mixture is allowed to stand at room temperature (10 to 30° C.) for 3 days. The reaction mixture is washed with water, sodium carbonate solution and water in order, dried over anhydrous sodium sulfate and evaporated to give a yellow oil (678 mg.). The oil is crystallized from a mixture of chloroform and hexane and recrystallized from methane to give 3,20-dioxo - 11β-thiocyanato-12α-hydroxy-5β-pregnane (529 mg.) as long pillars melting at 153 to 154° C.

To a solution of 3,20-dioxo-11β-thiocyanato-12α-hydroxy-5β-pregnane (536 mg.) above prepared in pyridine (5.3 ml.), there is added methanesulfonyl chloride (0.5 ml.) while cooling with ice, and the resultant mixture is allowed to stand at room temperature (10 to 30° C.) overnight. Then, water is added thereto whereby crystals are separated. The separated crystals are collected by filtration, washed with water and then methanol and recrystallized from acetone to give 3,20-dioxo-11β-thiocyanato-12α-methanesulfonyloxy-5β-pregnane (238 mg.) as cubic crystals melting at 208 to 209° C. (decomp.).

In a solution of potassium hydroxide (100 mg.) in water (2 ml.), there is suspended 3,20-dioxo-11β-thiocyanato - 12α-methanesulfonyloxy-5β-pregnane (135 mg.) above prepared, and the resultant suspension is mildly heated for a while and then allowed to stand at room temperature (10 to 30° C.) overnight. The reaction mixture is combined with water and shaken with ether. The ether extract is washed with water, dried over anhydrous sodium sulfate and evaporated to give a yellow oil (150 mg.). The oil is crystallized from methanol to give 3,20-dioxo-11β,12β-epithio-5β-pregnane (77 mg.) as plates melting at 152 to 153° C.

The starting material of this example, 3,20-dioxo-11α,12α-epoxy-5β-pregnane, is prepared from 3,20-dioxo-11-5β-pregnene [G. Just et al.: J. Org. Chem., 23, 12 (1958)] according to the following scheme:

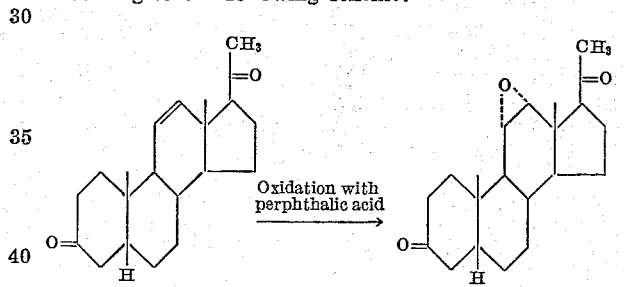

*Example 3*

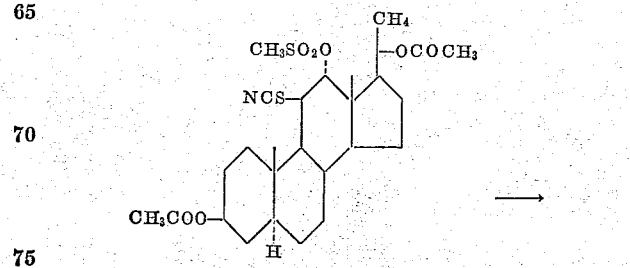

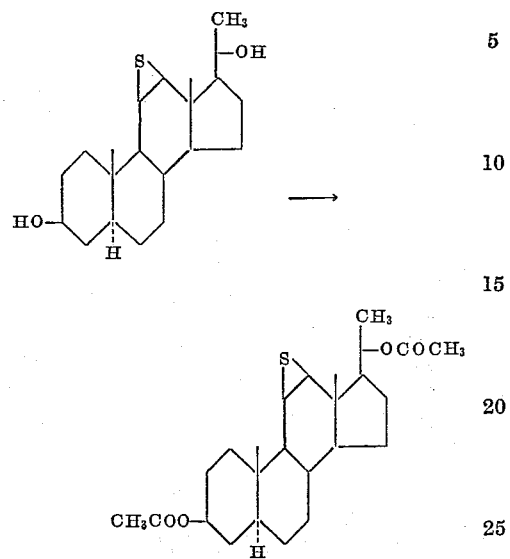

To an etheral solution of thiocyanic acid prepared from potassium thiocyanate (10.1 g.) and phosphoric acid (12.5 g.), there is added 3β,20β-diacetyloxy-11α,12α-epoxy-5α-pregnane (1.5 g.), and the resultant mixture is allowed to stand at room temperature (10 to 30° C.) two overnights. The reaction mixture is washed with water, dried over anhydrous sodium sulfate and evaporated to give an oily substance (1.9 g). The oil is crystallized from a mixture of chloroform and hexane to give 3β,20β-diacetyloxy - 11β - thiocyanato - 12α - hydroxy - 5α - pregnane (1.5 g.) as cubic crystals melting at 94 to 96° C.

To a solution of 3β,20β-diacetyloxy-11β-thiocyanato-12α-hydroxy-5α-pregnane (1.5 g.) above prepared in pyridine (13 ml.), there is added methanesulfonyl chloride (1.6 ml.) while cooling with ice, and the resultant mixture is allowed to stand at room temperature (10 to 30° C.) overnight. The reaction mixture is combined with water and shaken with a mixture of chloroform and ether (1:4). The organic solvent layer is washed with water, dried and evaporated to give an oily substance (2.1 g.). The oily substance is crystallized from acetone to give 3β,20β-diacetyloxy-11β-thiocyanato-12α-methane sulfonyloxy-5α-pregnane (1.0 g.) as prisms melting at 188 to 189° C. (decomp.).

To a solution of potassium hydroxide (2 g.) in methanol (40 ml.), there is added 3β,20β-diacetyloxy-11β-thiocyanato-12α-methanesulfonyloxy-5α-pregnane (393 mg.) above prepared, and the resultant mixture is refluxed for 2 hours. The reaction mixture is combined with water and concentrated under reduced pressure to remove methanol. The resulting solution is shaken with a mixture of chloroform and ether (1:4). The organic solvent layer is washed with water, dried and evaporated to give an oily substance (325 mg.). The oily substance is crystallized from methanol to give 3β,20β-dihydroxy-11β,12β-epithio-5α-pregnane (190 mg.) as thick plates melting at 158 to 160° C.

The thus prepared 3β,20β-dihydroxy-11β,12β-epithio-5α-pregnane (110 mg.) is heated with acetic anhydride (1 ml.) and pyridine (2 ml.) on a steam bath for 2 hours. The reaction mixture is treated according to a conventional manner and the resultant product crystallized from ether to give 3β,20β-diacetyloxy-11β,12β-epithio-5α-pregnane (108 mg.) as crystals melting at 174 to 176° C.

The starting material of this example, 3β,20β-diacetyloxy-11α,12α-epoxy-5α-pregnane, is a known compound [Callow et al.: J. Chem. Soc., 4744 (1956)].

Example 4

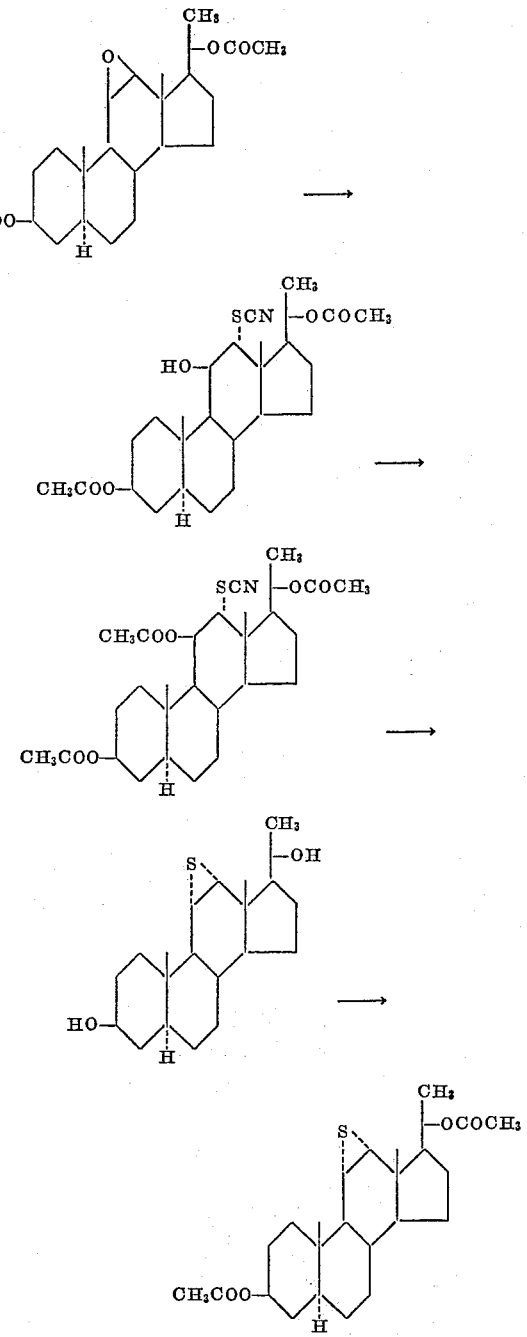

To an ethereal solution of thiocyanic acid prepared from potassium thiocyanate (3.8 g.) and phosphoric acid (4.7 g.), there is added 3β,20β-diacetyloxy-11β,12β-epoxy-5α-pregnane (557 mg.), and the resultant mixture is allowed to stand at room temperature (10 to 30° C.) two overnights. The reaction mixture is shaken with ether. The ether layer is washed with water, dried over anhydrous sodium sulfate and evaporated to give crude crystals (634 mg.). The crude crystals are recrystallized from a mixture of chloroform and hexane to give 3β,20β-diacetyloxy - 11β - hydroxy - 12α - thiocyanato - 5α - pregnane (596 mg.) as needles melting at 213 to 215° C.

3β,20β - Diacetyloxy - 11β - hydroxy - 12α - thiocyanato-5α-pregnane (760 mg.) above prepared and p-toluenesulfonic acid (250 mg.) are dissolved in a mixture of acetic acid (24 ml.) and acetic anhydride (13 ml.), and the resultant solution is allowed to stand at room temperature (10 to 30° C.) for 3 days. The reaction mixture is poured onto ice-water and shaken with a mixture of ether and chloroform (4:1). The organic solvent layer is washed with water, sodium carbonate solution and water in order, dried and evaporated. The residue is crystallized from a mixture of ether and petroleum ether and recrystallized from a mixture of acetone and hexane to give 3β,11β,20β - triacetyloxy - 12α - thiocyanato - 5α - pregnane (715 mg.) as prisms melting at 143 to 145° C.

A mixture of 3β,11β,20β-triacetyloxy-12α-thiocyanato-5α-pregnane (605 mg.) above prepared and potassium hydroxide (900 mg.) in 95% ethanol (25 ml.) is refluxed on a steam bath for 2 hours. The reaction mixture is combined with water and shaken with ether. The ether layer is washed with water, dried over anhydrous sodium sulfate and evaporated. The residue (388 mg.) is crystallized from a mixture of methanol and water and recrystallized from a mixture of acetone and hexane to give 3β,20β - dihydroxy - 11α,12α - epithio - 5α - pregnane (350 mg.) as long pillars melting at 174 to 176° C.

The thus prepared 3β,20β-dihydroxy-11α,12α-epithio-5α-pregnane (110 mg.) is combined with a mixture of acetic anhydride (1 ml.) and pyridine (2 ml.), heated on a steam bath for 1 hour and then allowed to stand at room temperature (10 to 30° C.) overnight. The reaction mixture is treated according to a conventional manner and the resulting product crystallized from a mixture of acetone and hexane to give 3β,20β-diacetyloxy-11α,12α-epithio-5α-pregnane (110 mg.) as pillars melting at 178 to 179° C.

The starting material of this example, 3β,20β-diacetyloxy-11β,12β-epoxy-5α-pregnane, is a known compound [Callow et al.: J. Chem. Soc., 4744 (1956)].

What is claimed is:
1. A member selected from the group consisting of compounds of the formulae:

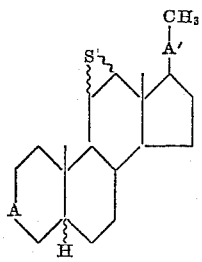

and

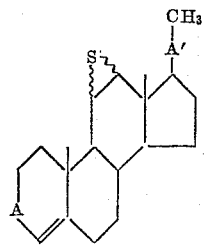

and

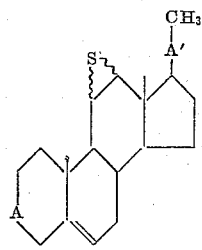

wherein A is a member selected from the group consisting of methylene, carbonyl, lower alkylenedioxymethylene, hydroxymethylene and lower alkanoyloxymethylene, and A' is a member selected from the group consisting of methylene, carbonyl, hydroxymethylene and lower alkanoyloxymethylene, A being carbonyl in the case of $\Delta^4$-unsaturation and being lower alkylenedioxymethylene in the case of $\Delta^5$-unsaturation.

2. 3,20-dioxo-11β,12β-epithio-4-pregnene.
3. 3,20-dioxo-11β,12β-epithio-5β-pregnane.
4. 3β,20β-dihydroxy-11β,12β-epithio-5α-pregnane.
5. 3β,20β - di(lower)alkanoyloxy - 11β,12β - epithio-5α-pregnane.
6. 3β,20β - diacetyloxy - 11β,12β - epithio - 5α - pregnane.
7. 3β,20β-dihydroxy-11α,12α-epithio-5α-pregnane.
8. 3β,20β - di(lower)alkanoyloxy - 11α,12α - epithio-5α-pregnane.
9. 3β,20β - diacetyloxy - 11α,12α - epithio - 5α - pregnane.
10. 3,20 - dioxo - 11β - thiocyanato - 12α - methanesulfonyloxy-4-pregnene.
11. 3,20 - dioxo - 11β - thiocyanato - 12α - methanesulfonyloxy-5β-pregnane.
12. 3β,20β - diacetyloxy - 11β - thiocyanato - 12α-methane-sulfonyloxy-5α-pregnane.
13. 3β,11β,20β - triacetyloxy - 12α - thiocyanato - 5α-pregnane.

References Cited in the file of this patent
UNITED STATES PATENTS
3,105,831   Komeno _____ Oct. 1, 1963